(12) United States Patent
Nielsen

(10) Patent No.: US 6,956,755 B2
(45) Date of Patent: Oct. 18, 2005

(54) RESONANT CONVERTER

(75) Inventor: Henning Roar Nielsen, Brenderup (DK)

(73) Assignee: American Power Conversion Corporation, Kolding (DK)

( * ) Notice: Subject to any disclaimer, the term of this patent is extended or adjusted under 35 U.S.C. 154(b) by 180 days.

(21) Appl. No.: 10/399,014

(22) PCT Filed: Sep. 18, 2001

(86) PCT No.: PCT/DK01/00599

§ 371 (c)(1),
(2), (4) Date: Sep. 19, 2003

(87) PCT Pub. No.: WO02/31955

PCT Pub. Date: Apr. 18, 2002

(65) Prior Publication Data

US 2004/0052099 A1 Mar. 18, 2004

(30) Foreign Application Priority Data

Oct. 13, 2000 (DK) .................................. 2000 01531

(51) Int. Cl.$^7$ ............................................ H02M 5/5387
(52) U.S. Cl. ............................ 363/132; 363/40; 363/98; 323/224; 323/225
(58) Field of Search ................................ 363/17, 21.02, 363/21.03, 40, 95, 97, 98, 131, 132, 135, 136; 323/224, 225, 282

(56) References Cited

U.S. PATENT DOCUMENTS 3,940,669 A  2/1976  Tsuboi et al.
4,310,866 A  1/1982  Wirth (Continued)

FOREIGN PATENT DOCUMENTS

EP  0 727 870 A2  8/1996
WO  WO 91/18442  11/1991

Primary Examiner—Gary L. Laxton

(74) *Attorney, Agent, or Firm*—Lowrie, Lando & Anastasi, LLP

(57) ABSTRACT

The invention relates to a resonant converter (200, 300). The resonant converter (200, 300) consists of a first circuit, primarily a DC circuit (201, 301) connected to a resonant circuit (207, 307) which is further connected to a switch/filter circuit (212, 312) which is connected to a second circuit, primarily an AC circuit (219, 319). The proposed resonant converter (200, 300) is unique in that the resonant converter (200, 300) contains a direct connection between a voltage center (203, 303) in the DC circuit (201, 301) and a voltage center (209, 309, 325) in the resonant circuit (207, 307), and that the resonant circuit (207, 307) contains at least one transformer having at least two windings (223, 224, 331, 332, 333, 334), wherein there is a connection from the windings (223, 224, 331, 332) of the transformer to at least first and second switches (215, 216, 315, 316, 328, 329), wherein activation of the switches (215, 216, 315, 316, 328, 329) forms a connection to at least a first node (214, 314, 327), wherein a voltage center (203, 303) in the DC circuit (201, 301) is also connected to the first node (214, 314, 327) by activation of at least a third switch (213, 313, 326). This results in a resonant converter (200, 300) wherein there are just switches (213, 215, 216, 313, 315, 316, 326, 328, 329) in the switch/filter circuit (212, 312) so that the number of switches (213, 215, 216, 313, 315, 316, 326, 328, 329) with power loss is as low as possible. The resonant converter (200, 300) moreover has the advantage that there is a direct connection from the center (203, 303) of the DC circuit (201, 301) to the load (219, 319), without this current path running through the coil (217, 317, 330) to the resonant circuit (207, 307). This minimizes the current load of the coil (217, 317, 330) and hereby the influence on the frequency of the resonant converter in case of a short-circuit on the output of the resonant converter (200, 300) where a great output current is to be provided, while the output voltage is close to zero volt. The reason is that a switch (213, 313, 326) in the switch/filter circuit (212, 312), which is connected to a voltage center (214, 314, 327), will conduct for by far the greatest part of the time at an output voltage close to zero volt, and that this current path bypasses the resonant circuit (207, 307). In addition, reduced switching across the switches (213, 215, 216, 313, 315, 316, 326, 328, 329) is achieved.

20 Claims, 7 Drawing Sheets

U.S. PATENT DOCUMENTS

Figure 1:
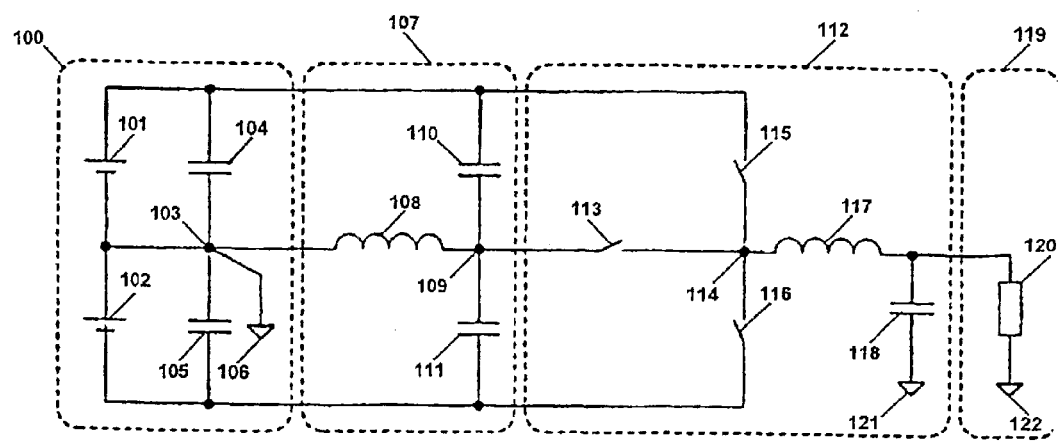

| | | |
|---|---|---|
| 5,047,913 A | 9/1991 | DeDoncker et al. |
| 5,111,374 A | 5/1992 | Lai et al. |
| 5,172,309 A * | 12/1992 | DeDoncker et al. ........ 363/132 |
| 5,495,404 A * | 2/1996 | Stephens .................... 363/132 |
| 5,559,685 A | 9/1996 | Lauw et al. |
| 5,566,064 A * | 10/1996 | Schoenwald et al. ....... 363/132 |
| 5,684,688 A | 11/1997 | Rouaud et al. |
| 5,949,669 A | 9/1999 | Bruckmann et al. |
| 6,046,920 A | 4/2000 | Cazabat et al. |
| 6,147,882 A * | 11/2000 | Huber et al. .................. 363/39 |
| 6,236,576 B1 | 5/2001 | Munk-Nielsen |
| 2004/0022073 A1 | 2/2004 | Nielsen |

* cited by examiner

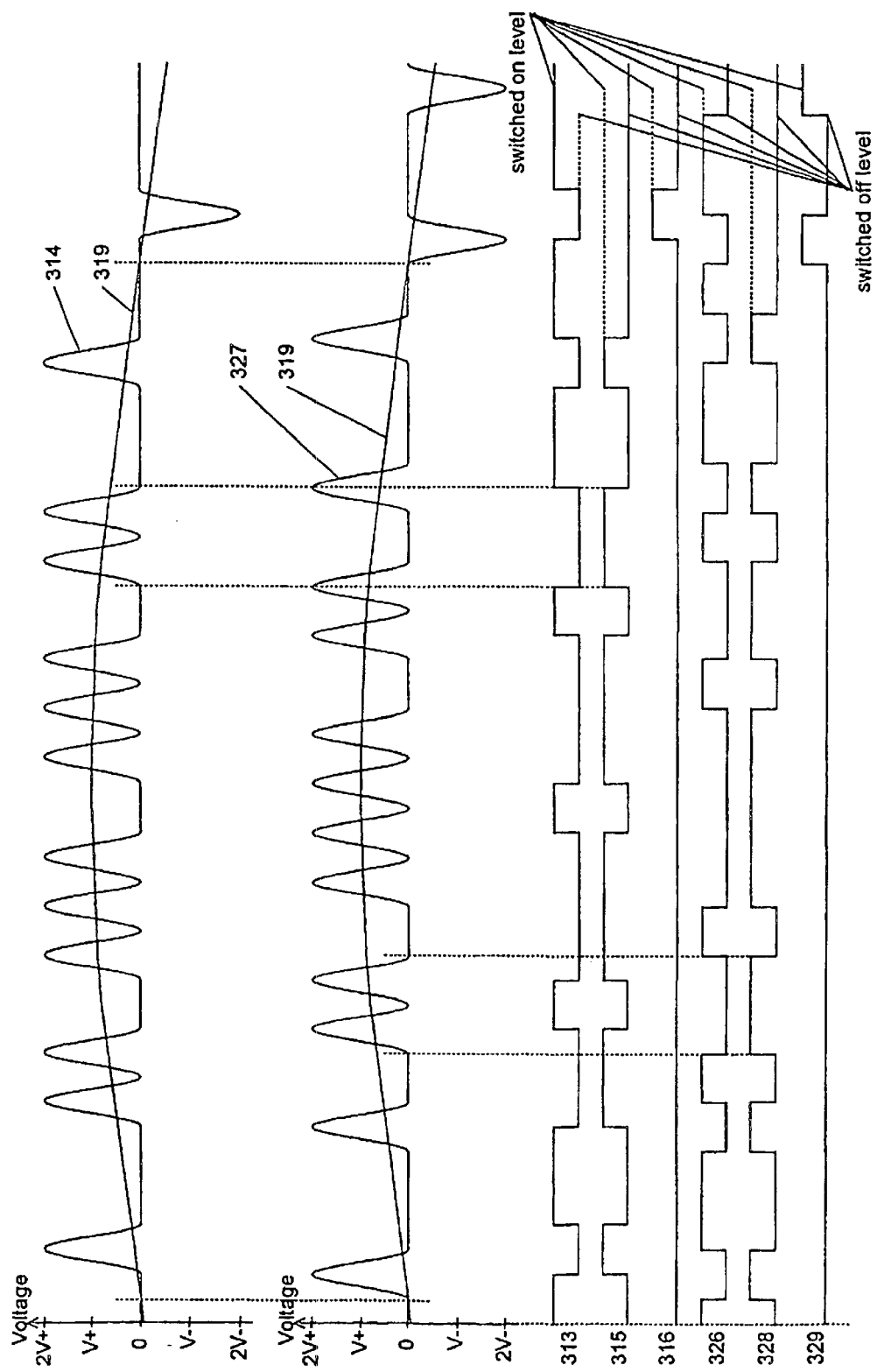

RESONANT CONVERTER

The invention relates to a resonant converter. The resonant converter consists of a first circuit, primarily a DC circuit connected to a resonant circuit which is further connected to a switch/filter circuit which is connected to a second circuit, primarily an AC circuit.

U.S. Pat. No. 5,047,913 discloses a resonant converter in which the resonant circuit is formed by two series-connected capacitors with connection to the positive and negative potentials of a supply voltage. From a centre between the capacitors there is a connection to a coil through a first set of semiconductor switches, and the other connection of the coil is connected to a centre in a second set of electronic switches, which are connected to the positive potential and to the neutral potential, respectively, of the supply voltage. The other connection of the coil also provides a connection to a centre between two other series-connected capacitors, which are connected to the positive and neutral potentials of the voltage supply. There is also a connection from the other connection of the coil to a second self-inductance from which there is a connection to the output of the circuit.

However, the use of electronic switches between capacitors and self-inductance results in an undesired voltage drop if the switches consist of semiconductors. If great currents are to be carried, a great power loss occurs.

DK 200000553 discloses a resonant converter for the supply of an electrical consumer, where the input circuit of the resonant converter forms a voltage centre which is connected through a self-inductance to a first node, from which there is a connection through capacitors to a positive supply potential and to a negative supply potential, said self-inductance being magnetically coupled to a magnetizing device which is magnetized in alternating directions by means of an electronic circuit.

Mounting of a self-inductance at a voltage centre, however, presents the inexpediency that a very great current runs through the voltage centre if the converter is to provide a great output current, while the output voltage is approximately zero, typically in case of a short-circuit on the output of the converter. This drawback is aggravated by a three-phased embodiment of the converter with a common resonant circuit.

However, a resonant converter frequently subjects the components to stress that is caused by a high voltage in resonant circuits and converter-switch circuits. Further, the use of resonant converters often gives rise to great ripple currents and ripple voltages on power inputs and power outputs. In case of high-power converters, these limitations constitute restraints and result in expensive, bulky and inefficient solutions.

An object of the embodiments of the invention is to provide a resonant converter with the smallest possible power loss, in which reduced voltage switching across the switches is achieved, and in which no resonant coil at a voltage centre is used.

This may be achieved in that the resonant converter contains a direct connection between a voltage centre in the DC circuit and a voltage centre in the resonant circuit, and that the resonant circuit contains at least one transformer having at least two windings, wherein there is a connection from the windings of the transformer to at least first and second switches, wherein activation of the switches forms a connection to at least a first node, wherein a voltage centre in the DC circuit is also connected to the first node by activation of at least a third switch.

This results in a resonant converter in which there are just switches in the switch/filter circuit, so that the number of switches with power loss is as low as possible. The resonant converter moreover has the advantage that there is a direct connection from the centre of the DC circuit to the load, without this current path running through the coil to the resonant circuit. This minimizes the current load of the coil and thereby the influence on the frequency of the resonant circuit in case of a short-circuit on the output of the converter, where a great output current is to be provided while the output voltage is close to zero volt. The reason is that, with an output voltage close to zero volt, a switch in the switch/filter circuit, which is connected to a voltage centre, will conduct for by far the greatest part of the time, and that this current path bypasses the resonant circuit. In addition, reduced voltage switching across the switches is achieved.

A DC circuit is primarily taken to mean a direct current and direct voltage supply circuit when the DC circuit operates as an input circuit, and secondarily a direct current and direct voltage load when the DC circuit operates as an output circuit. An AC circuit is primarily taken to mean an alternating current and alternating voltage load when the AC circuit operates as an output circuit, and secondarily an alternating current and alternating voltage supply circuit when the AC circuit operates as an input circuit.

The transformer may have additional windings which operate in anti-phase to the windings.

The additional windings may be used for establishing a double resonant converter, where two resonant circuits operate in parallel and their output currents are merged. The input ripple energy will switch between the two circuits, and the total ripple is minimized seen from the input.

The resonant converter may be used as a DC to AC converter.

This provides the possibility of adapting an AC load to a DC supply.

Alternatively, the resonant converter may be used as an AC to DC converter, wherein the first node of the resonant converter is connected to an AC supply, wherein the first node is connected, by activation of switches, to windings on the transformer, said transformer having windings connected to a DC circuit.

This provides the possibility of adapting a DC load to an AC supply.

The resonant converter may be incorporated in an N-phase system having at least one resonant converter per phase, the number of phases N being at least 1.

This provides a multi-phase supply circuit with a low power loss, in which the associated DC supply circuit is loaded with the lowest possible high frequency ripple current for single-phase systems as well as multi-phase systems, if the resonant converter is a double resonant converter.

Several switch/filter circuits in the N-phase system may use the same common resonant circuit and the same common DC circuit, wherein each phase is formed by activation of independent sets of switches.

This results in a component saving for the resonant converter in multi-phase systems.

The resonant converter may be used as an AC to AC converter.

This provides a further possible use for the resonant converter.

Used as an AC to AC converter, the resonant converter may convert at least one of the parameters frequency, voltage and current.

The resonant converter may hereby be used in connection with adaptation of an AC power supply to loads with varying frequency, voltage and current requirements.

For example, semiconductors are used in the resonant converter as switches comprising the option of selecting among the types thyristor, triac, field effect transistor, bipolar transistor, Insulated Gate Bipolar transistor (IGBT), Gate Turn-Off thyristor (GTO) and Injection Enhanced Gate Transistor (IEGT).

This provides a resonant converter which occupies little space, and in which the semiconductor type used may be adapted on the basis of desired current, voltage or power.

Control signals for switches may be generated by an overall control system by means of a pulse modulator.

This results in digital control of the resonant converter, which may be desirable in an electronic circuit which contains a digital circuit as a timing circuit.

The resonant converter may use three point modulation.

This results in a simple modulation form which does not require circuits for determining the position of the signal relative to ground.

The resonance may be controlled by the switches in the switch/filter circuit.

As a result, additional control circuits may be saved, thereby providing a saving of both power and space.

The resonance may be controlled by a power source which is magnetically coupled to the resonant circuit via the transformer core.

The current source hereby feeds the resonant circuit with a suitable level of energy and moreover compensates for the loss of the resonant circuit.

Figure 2:
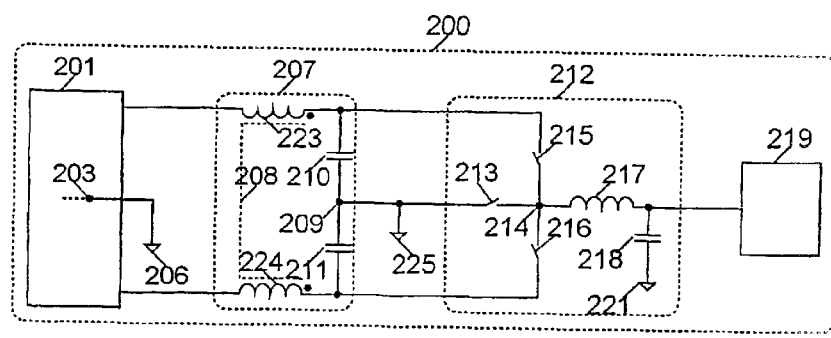
Figure 3:
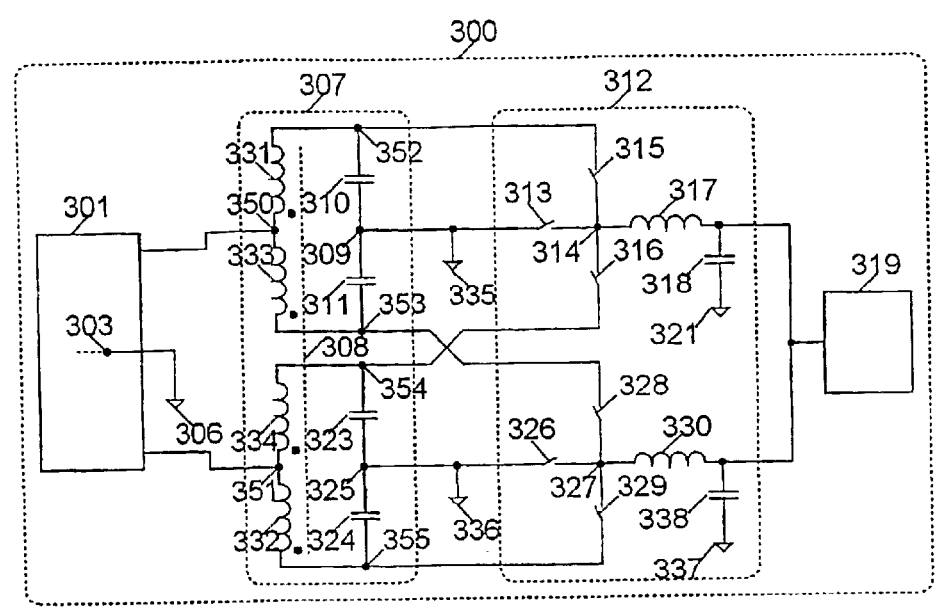
Figure 4:
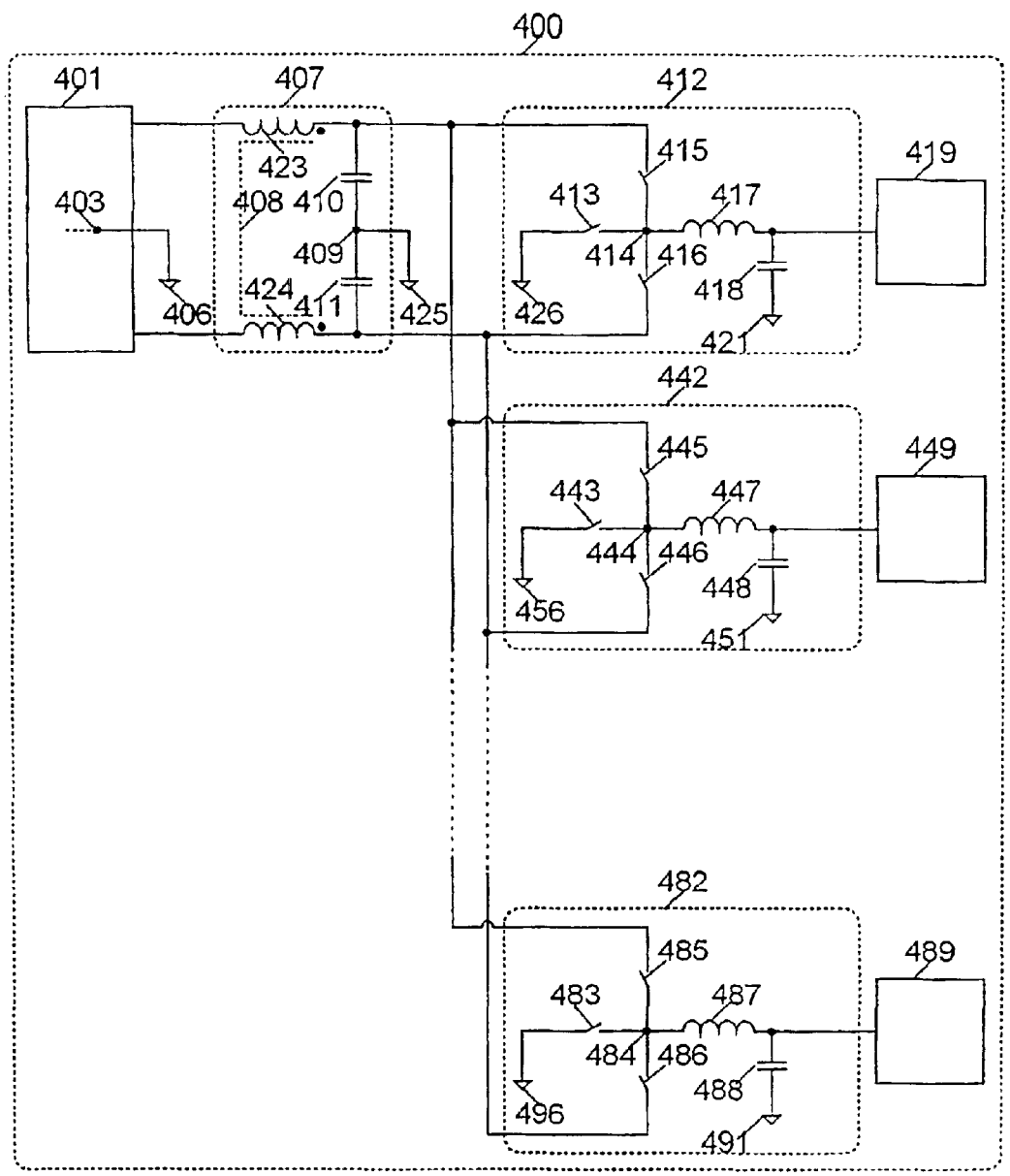
Figure 5:
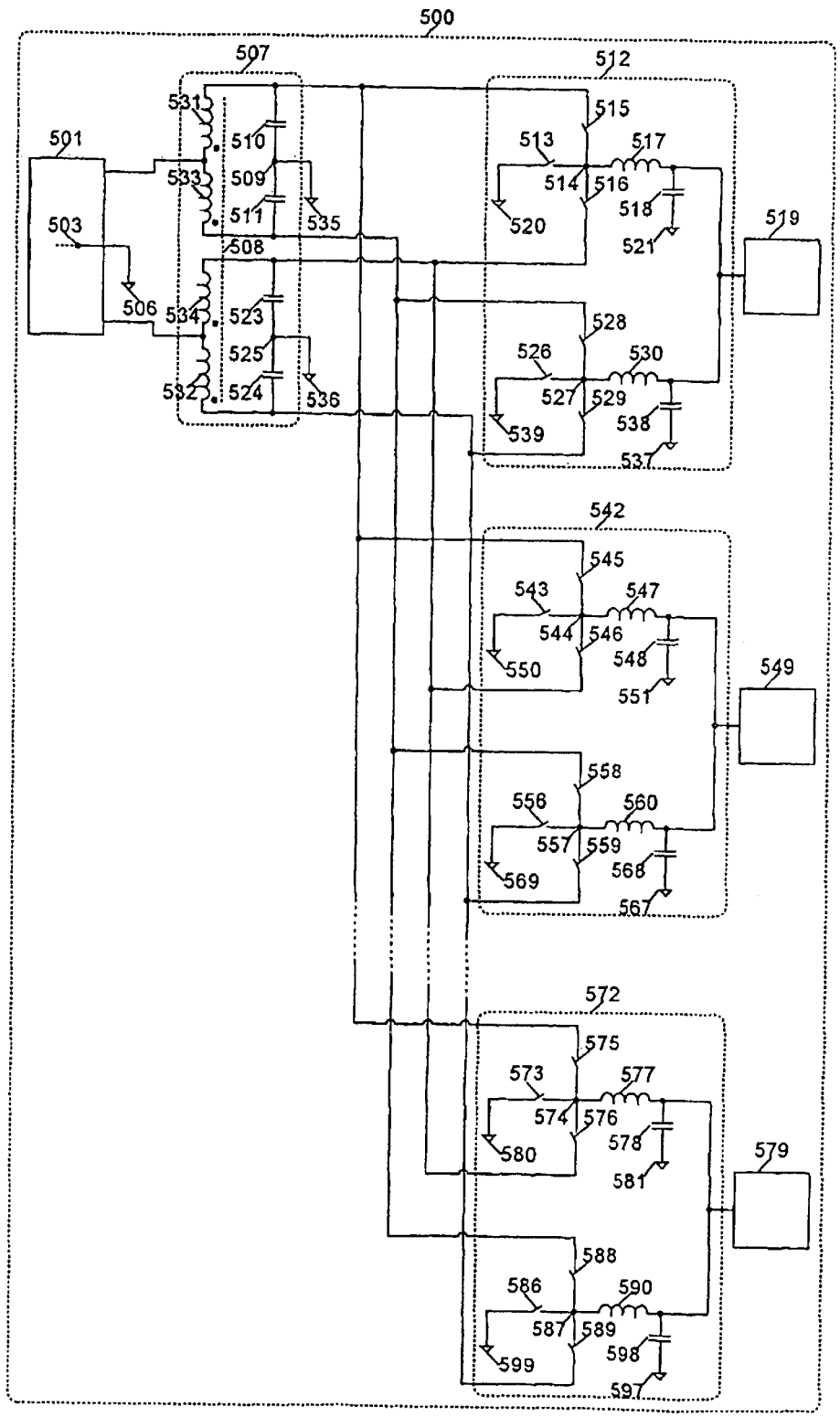
Figure 6:
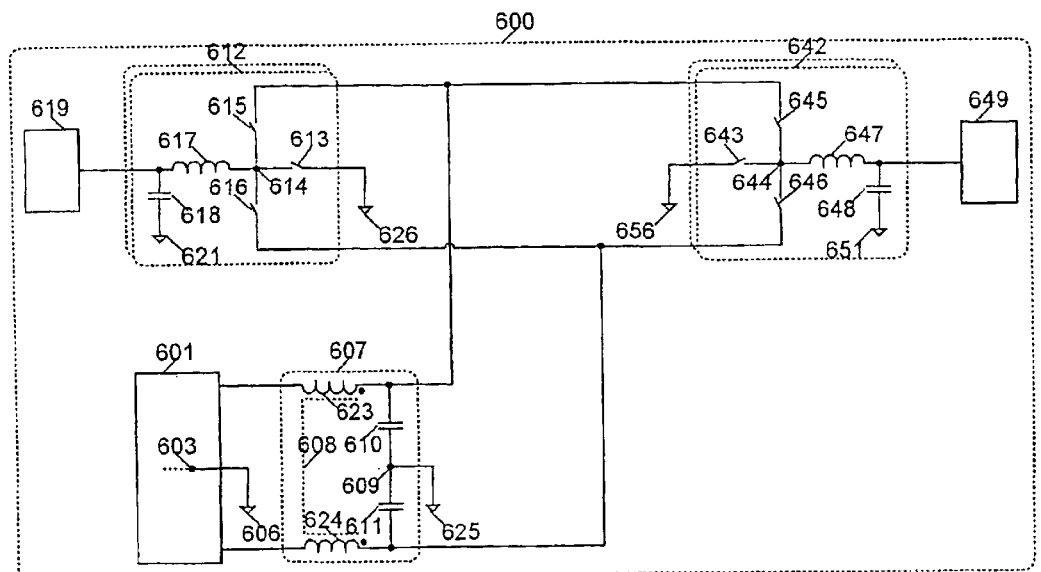
Figure 7:
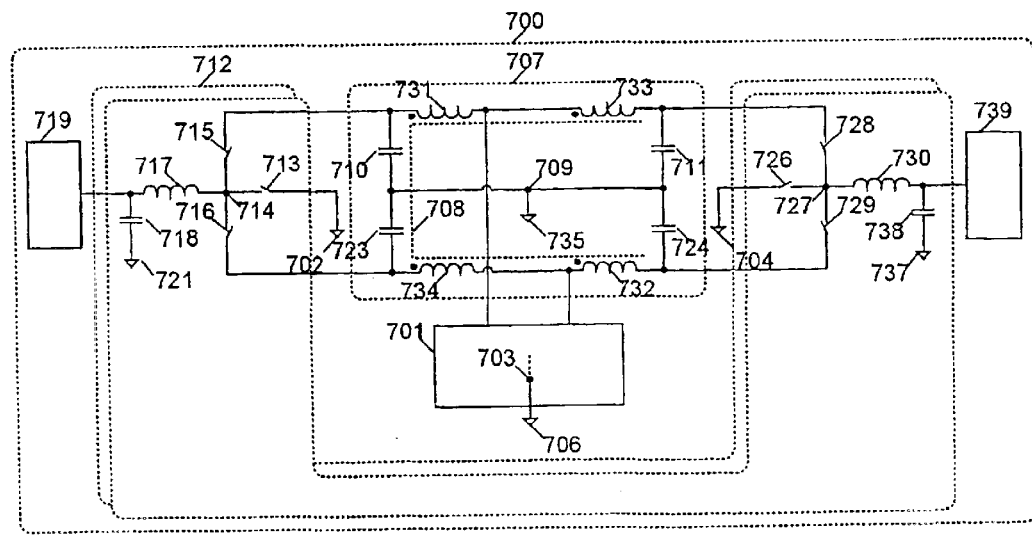
Figure 8:
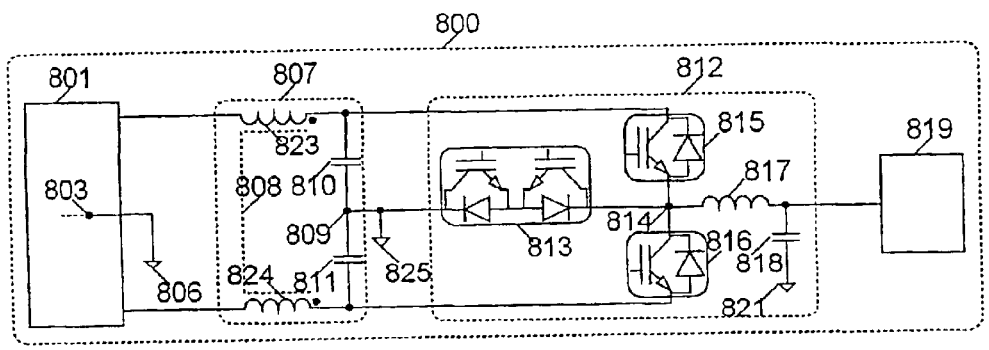
Figure 9:
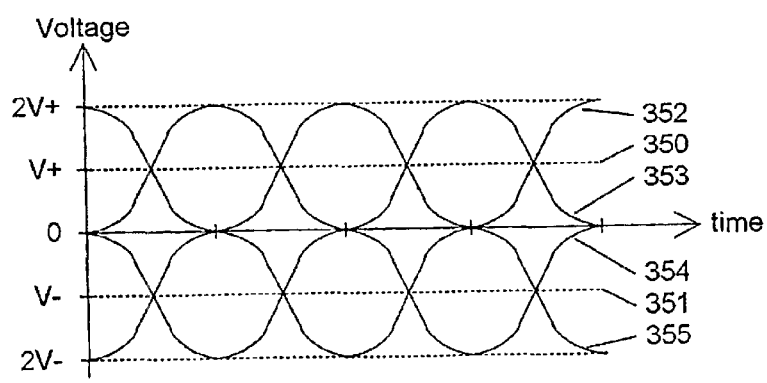

The invention will be explained more fully below with reference to the accompanying figures, in which FIG. 1 shows a known embodiment of a resonant converter, FIG. 2 shows a first possible embodiment of a new resonant converter, FIG. 3 shows a possible embodiment of a double resonant converter, FIG. 4 shows a possible embodiment of an N-phase resonant converter built with a common DC supply circuit, FIG. 5 shows a possible embodiment of an N-phase double resonant converter built with a common DC supply circuit, FIG. 6 shows a possible embodiment of an alternative 2-phase resonant converter, optionally an N-phase resonant converter, built with a common DC supply circuit used as an AC to AC converter, FIG. 7 shows a possible embodiment of a double resonant converter, optionally an N-phase resonant converter, built with a common DC supply circuit used as an AC to AC converter, FIG. 8 shows a possible embodiment of a resonant converter where the switches are realized by means of semiconductors, FIG. 9 shows possible curve shapes for voltage courses of the voltages on the resonant circuit of a double resonant converter, and FIG. 10 shows possible curve shapes of voltage courses as well as control signals for switches of a double resonant converter.

FIG. 1 shows a known resonant converter. A DC supply circuit (100) consists of two series-connected batteries (101, 102) having a common node (103), where a capacitor (104) is connected in parallel across the battery (101), and a capacitor (105) is connected in parallel across the battery (102). The node (103) is further connected to an earth point (106) as well as a coil (108) in a resonant circuit (107). The coil (108) is further connected to a node (109), which is in connection with two capacitors (110, 111), The capacitor (110) is further connected to the battery (101), and the capacitor (111) is further connected to the battery (102). The node (109) is further connected to a switch (113) in a switch/filter circuit (112). The switch (113) is further connected to a node (114) which is connection with two switches (115, 116). The switch (115) is further connected to the battery (101), and the switch (116) is further connected to the battery (102). The node (114) is connected to a coil (117). The coil (117) is further connected to a capacitor (118) and to a load (120) in a load circuit (119). The capacitor (118) is further connected to an earth point (121). The load (120) of the load circuit (119) is further connected to an earth point (122).

At the node (109), the voltage oscillates between potentials which correspond to the positive potential of the battery (101) and the negative potential of the battery (102). The resonance is controlled by a current source which is coupled magnetically to the resonant circuit (107) via the coil (108). The current source feeds the resonant circuit (107) with a suitable level of energy and compensates for the loss of the resonant circuit. In addition, the current source is adjusted relative to the load (120). The node (114) is connected to the coil (108) at times when the switch (113) is closed. The node (114) is correspondingly connected to the positive supply voltage and the negative supply voltage, respectively, at times when the switch (115) and the switch (116), respectively, are closed. The node (114) is connected to the load (120) via an LC filter consisting of a coil (117) and a capacitor (118). The LC filter ensures that high frequency is not transferred to the load (120).

FIG. 2 shows a resonant converter (200). A DC supply circuit (201) contains a node (203), which is further connected to an earth point (206). A resonant circuit (207) contains a transformer having two windings (223, 224) which are coupled magnetically via a core (208). The winding (223) is connected between the first terminal of the DC supply circuit (201) and a capacitor (210). The winding (224) is connected between the second terminal of the DC supply circuit (201) and a capacitor (211). The capacitors (210, 211) are further connected to a node (209). The node (209) is connected to an earth point (225) and a switch (213) in a switch/filter circuit (212). The switch (213) is further connected to a node (214). The node (214) is in connection with two switches (215, 216). The switch (215) is further connected to the capacitor (210), and the switch (216) is further connected to the capacitor (211). The node (214) is moreover connected to a coil (217). The coil (217) is further conected to a capacitor (218) and to a load (219). The capacitor (218) is further connected to an earth point (221).

On the capacitor (210) and the capacitor (211) the voltages oscillate between voltages corresponding to the total voltage across the DC supply circuit (201) and 0V, so that there is maximum voltage across the one of the capacitors, while the voltage is zero volt across the other capacitor. The resonance may be controlled by the switches (213, 215, 216), or by a power source which is coupled magnetically to the resonant circuit (207) via a core (208). If a current source is used, the current source feeds the resonant circuit (207) with a suitable level of energy and compensates for the loss of the resonant circuit (207). The current source may optionally be adjusted relative to the load (209). The node (214) is connected to the node (209) when the switch (213) is closed. The node (214) is also connected to the positive supply voltage and the negative supply voltage, respectively, via the winding (223) and the winding (214), respectively, when the switch (215) and the switch (216), respectively, are closed. The node (214) is connected to the load (219) via an LC filter consisting of a coil (217) and a capacitor (218). The LC filter ensures that high frequency is not transferred.

FIG. 3 shows a double resonant converter (300). A DC supply circuit (301) contains a node (303) which is further connected to an earth point (306). A resonant circuit (307) contains a transformer having four windings (331, 332, 333, 334) which are coupled magnetically via a core (308). The winding (331) is connected between the one terminal of the DC supply circuit (301) at a node (350) and a capacitor (310) at a node (352). The winding (332) is connected between the second terminal of the DC supply voltage (301) at a node (351) and a capacitor (324) at a node (355). The capacitor (310) is further connected to a node (309). The node (309) is further connected to an earth point (335). The capacitor (324) is further connected to a node (325). The node (325) is further connected to an earth point (336). The winding (333) is connected between the one terminal of the DC supply circuit (301) at a node (350) and a capacitor (311) at a node (353). The winding (334) is connected between the second terminal of the DC supply circuit (301) at a node (351) and a capacitor (323) at a node (354). The capacitor (311) is further connected to the node (309). The capacitor (323) is further connected to the node (325). The earth point (335) is connected to a switch (313) in a switch/filter circuit (312). The switch (313) is further connected to a node (314) which is in connection with two switches (315, 316). The switch (315) is further connected to the node (352). The switch (316) is further connected to the node (354). The node (314) is connected to a coil (317). The coil (317) is further connected to a capacitor (318) and to a load (319). The capacitor (318) is further connected to an earth point (321). The earth point (336) is connected to a switch (326) in the switch/filter circuit (312). The switch (326) is further connected to a node (327) which is in connection with two switches (328, 329). The switch (328) is further connected to the node (353). The switch (329) is further connected to the node (355). The node (327) is connected to a coil (330). The coil (330) is further connected to a capacitor (338) and to the load (319). The capacitor (338) is further connected to an earth point (337).

The resonant circuit (307) is divided into two sections which operate in anti-phase. The windings (331, 332, 333, 334) of the two sections are coupled magnetically as a transformer via the common core (308). Each section feeds its own set of switches (313, 315, 316, 326, 328, 329) in the switch/filter circuit (312) so that the two sets of switches (313, 315, 316, 326, 328, 329) operate in parallel, and their output currents are merged. The input ripple energy will therefore switch between the two circuits, and the total ripple is minimized seen from the input. On the capacitor (310) and the capacitor (323) the voltages oscillate between voltages corresponding to the total voltage across the DC supply circuit (301) and 0V, so that there is maximum voltage across the one of the capacitors, while the voltage is zero volt across the other capacitor. On the capacitor (311) and the capacitor (324) the voltages oscillate between voltages corresponding to the total voltage across the DC supply circuit (301) and 0V, so that there is maximum voltage across the one of the capacitors, while the voltage is zero volt across the other capacitor. The voltage across the capacitor (310) is in anti-phase to the voltage across the capacitor (311), and the voltage across the capacitor (323) is in anti-phase to the voltage across the capacitor (324). The resonance may be controlled by the switches (313, 315, 316, 326, 328, 329), or by a current source which is coupled magnetically to the resonant circuit (307) via the core (308).

If a current source is used, the current source feeds the resonant circuit (307) with a suitable level of energy and compensates for the loss of the resonant circuit. In addition, the current source is adjusted relative to the load (319). The node (314) is connected to the node (309) when the switch (313) is closed. The node (314) is also connected to the positive supply voltage and the negative supply voltage, respectively, via the winding (331) and the winding (334), respectively, when the switch (315) and the switch (316), respectively, are closed. The node (327) is connected to the node (325) when the switch (326) is closed. The node (327) is also connected to the positive supply voltage and the negative supply voltage, respectively, via the winding (333) and the winding (332), respectively, when the switch (328) and the switch (329), respectively, are closed. The node (314) is connected to the load (319) via an LC filter consisting of a coil (317) and a capacitor (318). The node (327) is connected to the load (319) via an LC filter consisting of a coil (330) and a capacitor (338). The LC filters ensure that high frequency is not transferred.

FIG. 4 shows an N-phase resonant converter (400) built with a common DC supply circuit (401). A DC supply circuit (401) contains a node (403) which is further connected to an earth point (406). A resonant circuit (407) contains a transformer having two windings (423, 424) which are coupled magnetically via a core (408). The winding (423) is connected between the first terminal of the DC supply circuit (401) and a capacitor (410). The winding (424) is connected between the second terminal of the DC supply circuit (401) and a capacitor (411). The capacitors (410, 411) are further connected to a node (409). The node (409) is connected to an earth point (425). For the first phase, a switch (413) in a switch/filter circuit (412) is connected to an earth point (426). The switch (413) is further connected to a node (414). The node (414) is connected to two switches (415, 416). The switch (415) is further connected to the capacitor (410), and the switch (416) is further connected to the capacitor (411). The node (414) is moreover connected to a coil (417). The coil (417) is further connected to a capacitor (418) and to a load (419). The capacitor (418) is further connected to an earth point (421). For the second phase, a switch (443) in a switch/filter circuit (442) is connected to an earth point (456). The switch (443) is further connected to a node (444). The node (444) is in connection with two switches (445, 446). The switch (445) is further connected to the capacitor (410), and the switch (446) is further connected to the capacitor (411). The node (444) is moreover connected to a coil (447). The coil (447) is further connected to a capacitor (448) and to a load (449). The capacitor (448) is further connected to an earth point (451). For N-phase, a switch (483) in a switch/filter circuit (482) is connected to an earth point (496). The switch (483) is further connected to a node (484). The node (484) is in connection with two switches (485, 486). The switch (485) is further connected to the capacitor (410), and the switch (486) is further connected to the capacitor (411). The node (484) is moreover connected to a coil (487). The coil (487) is further connected to a capacitor (488) and to a load (489). The capacitor (488) is further connected to an earth point (491).

On the capacitor (410) and the capacitor (411) the voltages oscillate between voltages corresponding to the total voltage across the DC supply circuit (401) and 0V, so that there is maximum voltage across the one of the capacitors, while the voltage is zero volt across the other capacitor. The resonance may be controlled by the switches (413, 415, 416), by the switches (443, 445, 446) or by the switches (483, 485, 486, respectively, or by a current source which is coupled magnetically to the resonant circuit (407) via a core (408). If a current source is used, the current source feeds the resonant circuit (407) with a suitable level of energy and compensates for the loss of the resonant circuit (407). In addition, the current source is adjusted relative to the load (419), the load (449), and the load (489), respectively. The node (414), the node (444) and the node (484), respectively, are connected to the node (409) when a switch (413), a switch (443) and a switch (483), respectively, are closed. The node (414), the node (444) and the node (484), respectively, are also connected to the positive supply voltage and the negative supply voltage, respectively, via the winding (423) and the winding (424), respectively, when the switch (415) and the switch (416), respectively, or when the switch (445) and the switch (446), respectively, or when the switch (485) and the switch (486), respectively, are closed. The node (414) is connected to the load (419) via an LC filter consisting of a coil (417) and a capacitor (418). The node (444) is connected to the load (449) via an LC filter consisting of a coil (447) and a capacitor (448). The node (484) is connected to the load (489) via an LC filter consisting of a coil (487) and a capacitor (488). The LC filters ensure that high frequency is not transferred to the load (419), the load (449) and the load (489), respectively.

FIG. 5 shows an N-phase double resonant converter (500) built with a common DC supply circuit (501). A DC supply circuit (501) contains a node (503) which is further connected to an earth point (506). A resonant circuit (507) contains a transformer having four windings (531, 532, 533, 534) which are coupled magnetically via a core (508). The winding (531) is connected between the one terminal of the DC supply circuit (501) and a capacitor (510). The winding (532) is connected between the other terminal of the DC supply circuit (501) and a capacitor (524). The capacitor (510) is further connected to a node (509). The node (509) is further connected to an earth point (535). The capacitor (524) is further connected to a node (525). The node (525) is further connected to an earth point (536). The winding (533) is connected between the one terminal of the DC supply circuit (501) and a capacitor (511). The winding (534) is connected between the other terminal of the DC supply circuit (501) and a capacitor (523). The capacitor (511) is further connected to the node (509). The capacitor (523) is further connected to the node (525). For the first phase, an earth point (520) is connected to a switch (513) in a switch/filter circuit (512). The switch (513) is further connected to a node (514) which is in connection with two switches (515, 516). The switch (515) is further connected to the capacitor (510). The switch (516) is further connected to the capacitor (523). The node (514) is connected to a coil (517). The coil (517) is further connected to a capacitor (518) and to a load (519). The capacitor (518) is further connected to an earth point (521). The earth point (539) is connected to a switch (526) in the switch/filter circuit (512). The switch (526) is further connected to a node (527) which is in connection with two switches (528, 529). The switch (528) is further connected to the capacitor (511). The switch (529) is further connected to the capacitor (524). The node (527) is connected to a coil (530). The coil (530) is further connected to a capacitor (538) and to the load (519). The capacitor (538) is further connected to an earth point (537). For the second phase, an earth point (550) is connected to a switch (543) in a switch/filter circuit (542). The switch (543) is further connected to a node (544) which is in connection with two switches (545, 546). The switch (545) is further connected to the capacitor (510). The switch (546) is further connected to the capacitor (523). The node (544) is connected to a coil (547). The coil (547) is further connected to a capacitor (548) and to a load (549). The capacitor (548) is further connected to an earth point (551). The earth point (569) is connected to a switch (556) in the switch/filter circuit (542). The switch (556) is further connected to a node (557) which is in connection with two switches (558, 559). The switch (558) is further connected to the capacitor (511). The switch (559) is further connected to the capacitor (524). The node (557) is connected to a coil (560). The coil (560) is further connected to a capacitor (568) and to the load (549). The capacitor (568) is further connected to an earth point (567). For the N'th phase, an earth point (580) is connected to a switch (573) in a switch/filter circuit (572). The switch (573) is further connected to a node (574) which is in connection with two switches (575, 576). The switch (575) is further connected to the capacitor (510). The switch (576) is further connected to the capacitor (523). The node (574) is connected to a coil (577). The coil (577) is further connected to a capacitor (578) and to a load (579). The capacitor (578) is further connected to an earth point (581). The earth point (599) is connected to a switch (586) in the switch/filter circuit (572). The switch (586) is further connected to a node (587) which is in connection with two switches (588, 589). The switch (588) is further connected to the capacitor (511). The switch (589) is further connected to the capacitor (524). The node (587) is connected to a coil (590). The coil (590) is further connected to a capacitor (598) and to the load (579). The capacitor (598) is further connected to an earth point (597).

The resonant circuit (507) is divided into two sections which operate in anti-phase. The windings (531, 534) and the windings (532, 533), respectively, of the two sections are magnetically coupled as a transformer via the common core (508). Each section feeds its own set of switches (513, 515, 516) and the switches (526, 528, 529), respectively, in the switch/filter circuit (512) for the first phase, and the switches (543, 545, 546) and the switches (556, 558, 559), respectively, in the switch/filter circuit (542) for the second phase, and the switches (573, 575, 576) and the switches (586, 588, 589), respectively in the switch/filter circuit (572) for the N'th phase, so that it applies to each of the phases that the two sets of switches (513, 515, 516) and the switches (526, 528, 529), respectively, for the first phase, and the switches (543, 545, 546) and the switches (556, 558, 559), respectively, for the second phase, and the switches (573, 575, 576) and the switches (586, 588, 589), respectively, for the N'th phase operate in parallel, and their output currents are merged. For each of the phases, the input ripple energy will therefore switch between the two circuits, and the total ripple will be minimized seen from the inputs. On the capacitor (510) and the capacitor (523) the voltages oscillate between voltages corresponding to the total voltage across the DC supply circuit (501) and 0V, so that there is maximum voltage across the one of the capacitors, while the voltage is zero volt across the other capacitor. On the capacitor (511) and the capacitor (524) the voltages oscillate between voltages corresponding to the total voltage across the DC supply circuit (501) and 0V, so that there is maximum voltage across the one of the capacitors, while the voltage is zero volt across the other capacitor. The voltage across the capacitor (510) is in antiphase to the voltage across the capacitor (511), and the voltage across the capacitor (523) is in anti-phase to the voltage across the capacitor (524). The resonance may be controlled by the switches (513, 515, 516) and the switches (526, 528, 529), respectively, for the first phase, and the switches (543, 545, 546) and the switches (556, 558, 559), respectively, for the second phase, and the switches (573, 575, 576) and the switches (586, 588, 589), respectively, for the N'th phase, or by a current source which is coupled magnetically to the resonant circuit (507) via the core (508). If a current source is used, the current source feeds the resonant circuit (507) with a suitable level of energy and compensates for the loss of the resonant circuit. In addition, the current source is adjusted relative to the load (519), the load (549) and the load (579), respectively. The node (514) and the node (544) and the node (574), respectively, are connected to the node (509), when the switch (513) and the switch (543) and the switch (573), respectively, are closed. The node (514) and the node (544) and the node (574, respectively, are connected to the positive supply voltage via the winding (531), when the switch (515) and the switch (545) and the switch (575), respectively, are closed. The node (514) and the node (544) and the node (574), respectively, are connected to the negative supply voltage via the winding (534), when the switch (516) and the switch (546) and the switch (576), respectively, are closed. The node (527) and the node (557) and the node (587), respectively, are connected to the node (525), when the switch (526) and the switch (556) and the switch (586), respectively, are closed. The node (527) and the node (557) and the node (587), respectively, are connected to the positive supply voltage via the winding (533), when the switch (528) and the switch (558) and the switch (588), respectively, are closed. The node (527) and the node (57) and the node (587), respectively, are connected to the negative supply voltage via the winding (532), when the switch (529) and the switch (559) and the switch (589), respectively, are closed. The node (514) is connected to the load (519) via an LC filter consisting of a coil (517) and a capacitor (518). The node (544) is connected to the load (549) via an LC filter consisting of a coil (547) and a capacitor (548). The node (574) is connected to the load (579) via an LC filter consisting of a coil (577) and a capacitor (578). The node (527) is connected to the load (519) via an LC filter consisting of a coil (530) and a capacitor (538). The node (557) is connected to the load (549) via an LC filter consisting of a coil (560) and a capacitor (568). The node (587) is connected to the load (579) via an LC filter consisting of a coil (590) and a capacitor (598). The LC filters ensure that high frequency is not transferred.

FIG. 6 shows a 2-phase resonant converter (600), optionally an N-phase resonant converter, built with a common DC supply circuit (601) which is used as an AC to AC converter. A DC supply circuit (601) contains a node (603) which is further connected to an earth point (606). A resonant circuit (607) contains a transformer having two windings (623, 624) which are coupled magnetically via a core (608). The winding (623) is connected between the first terminal of the DC supply circuit (601) and a capacitor (610). The winding (624) is connected between the second terminal of the DC supply circuit (601) and a capacitor (611). The capacitors (610, 611) are further connected to a node (609). The node (609) is further connected to an earth point (625). For the one phase, a switch (613) of a switch/filter circuit (612) is connected to an earth point (626). The switch (613) is further connected to a node (614). The node (614) is in connection with two switches (615, 616). The switch (615) is further connected to the capacitor (610), and the switch (616) is further connected to the capacitor (611). The node (614) is moreover connected to a coil (617). The coil (617) is further connected to a capacitor (618) and to an AC supply circuit (619). The capacitor (618) is further connected to an earth point (621). For the other phase, a switch (643) in a switch/filter circuit (642) is connected to an earth point (656). The switch (643) is further connected to a node (644). The node (644) is in connection with two switches (645, 646). The switch (645) is further connected to the capacitor (610), and the switch (646) is further connected to the capacitor (611). The node (644) is moreover connected to a coil (647). The coil (647) is further connected to a capacitor (648) and to a load (649). The capacitor (648) is further connected to an earth point (651). On the capacitor (610) and the capacitor (611) the voltages oscillate between voltages corresponding to the total voltage across the DC supply circuit (601) and 0V, so that there is maximum voltage across the one of the capacitors, while the voltage is zero volt across the other capacitor. The resonance may be controlled by the switches (613, 615, 616) and the switches (643, 645, 646), respectively, or by a current source which is coupled magnetically to the resonance circuit (607) via a core (608). If a current source is used, the current source feeds the resonant circuit (607) with a suitable level of energy and compensates for the loss of the resonant circuit (607). In addition, the current source is adjusted relative to the AC supply circuit (619) and the load (649). The node (614) and the node (644), respectively, are connected to the node (609) when a switch (613) and a switch (643), respectively, are closed. The node (614) and the node (644), respectively, are connected to the positive supply voltage and the negative supply voltage, respectively, via the winding (623) and the winding (624), respectively, when the switch (615) and the switch (616), respectively, or when the switch (645) and the switch (646), respectively, are closed. The node (614) is connected to the AC supply circuit (619) via an LC filter consisting of a coil (617) and a capacitor (618). The node (644) is connected to the load (649) via an LC filter consisting of a coil (647) and a capacitor (648). The LC filters ensure that high frequency is not transferred to the AC supply circuit (619) or the load (649).

FIG. 7 shows a possible embodiment of a double resonant converter (700), optionally an N-phase resonant converter, built with a common DC supply circuit (701). The circuit may be used as an AC to AC converter. A DC supply circuit (701) contains a node (703) which is further connected to an earth point (706). A resonant circuit (707) contains a transformer having four windings (731, 732, 733, 734) which are coupled magnetically via a core (708). The winding (731) is connected between the one terminal of the DC supply circuit (701) and a capacitor (710). The winding (732) is connected between the other terminal of the DC supply circuit (701) and a capacitor (724). The capacitor (710) is further connected to a node (709). The node (709) is further connected to an earth point (735). The capacitor (724) is further connected to the node (709). The winding (733) is connected between the one terminal of the DC supply circuit (701) and a capacitor (711). The winding (734) is connected between the other terminal of the DC supply circuit (701) and a capacitor (723). The capacitor (711) is further connected to the node (709). The capacitor (723) is further connected to the node (709). The earth point (702) is connected to a switch (713) in a switch/filter circuit (712). The switch (713) is further connected to a node (714) which is in connection with two switches (715, 716). The switch (715) is further connected to the capacitor (710). The switch (716) is further connected to the capacitor (723). The node (714) is connected to a coil (717). The coil (717) is further connected to a capacitor (718) and to an AC supply circuit (719). The capacitor (718) is further connected to an earth point (721). The earth point (704) is connected to a switch (726) in the switch/filter circuit (712). The switch (726) is further connected to a node (727) which is in connection with two switches (728, 729). The switch (728) is further connected to the capacitor (711). The switch (729) is further connected to the capacitor (724). The node (727) is connected to a coil (730). The coil (730) is further connected to a capacitor (738) and to a load (739). The capacitor (738) is further connected to an earth point (737).

On the capacitor (710) and the capacitor (723) the voltages oscillate between voltages corresponding to the total voltage across the DC supply circuit (701) and 0V, so that there is maximum voltage across the one of the capacitors, while the voltage is zero volt on the other capacitor. On the capacitor (711) and the capacitor (724) the voltages oscillate between voltages corresponding to the total voltage across the DC supply voltage (701) and 0V, so that there is maximum voltage across the one of the capacitors, while the voltage is zero volt across the other capacitor. The voltage across the capacitor (710) is in anti-phase to the voltage across the capacitor (711), and the voltage across the capacitor (723) is in anti-phase to the voltage across the capacitor (724). The voltage at the node (714) and the voltage at the node (727) possibly oscillate with different frequencies. The resonance may be controlled by the switches (713, 715, 716) and the switches (726, 728, 729), respectively, or by a current source which is coupled magnetically to the resonant circuit (707) via the core (708). If a current source is used, the current source feeds the resonant circuit (707) with a suitable level of energy and compensates for the loss of the resonant circuit (707). In addition, the current source is adjusted relative to the AC supply circuit (719) and the load (739). The node (714) and the node (727), respectively, are connected to the node (709) when a switch (713) and a switch (726), respectively, are closed. The node (714) and the node (727), respectively, are connected to the positive supply voltage and the negative supply voltage, respectively, via the winding (731) and the winding (734), respectively, when the switch (715) and the switch (716), respectively, are closed, or via the winding (733) and the winding (732), respectively when the switch (728) and the switch (729), respectively, are closed. The node (714) is connected to the AC supply circuit (719) via an LC filter consisting of a coil (717) and a capacitor (718). The node (727) is connected to the load (739) via an LC filter consisting of a coil (730) and a capacitor (738). The LC filters ensure that high frequency is not transferred to the AC supply circuit (719) or the load (739).

FIG. 8 shows a resonant converter (800), where the switches are realized by means of semiconductors. A DC supply circuit (801) contains a node (803) which is further connected to an earth point (806). A resonant circuit (807) contains a transformer having two windings (823, 824) which are coupled magnetically via a core (808). The winding (823) is connected between the first terminal of the DC supply circuit (801) and a capacitor (810). The winding (824) is connected between the second terminal of the DC supply circuit (801) and a capacitor (811). The capacitors (810, 811) are further connected to a node (809). The node (809) is connected to an earth point (825) and a semiconductor switch (813) in a switch/filter circuit (812). The semiconductor switch (813) is further connected to a node (814). The node (814) is in connection with two semiconductor switches (815, 816). The semiconductor switch (815) is further connected to the capacitor (810), and the semiconductor switch (816) is further connected to the capacitor (811). The node (814) is further connected to a coil (817). The coil (817) is further connected to a capacitor (818) and to a load (819). The capacitor (818) is further connected to an earth point (821).

On the capacitor (810) and the capacitor (81) the voltages oscillate between voltages corresponding to the total voltage across the DC supply circuit (801) and 0V, so that there is maximum voltage across the one of the capacitors, while the voltage is zero volt across the other capacitor. The resonance may be controlled by the semiconductor switches (813, 815, 816), or by a current source which is coupled magnetically to the resonant circuit (807) via the core (808). If a current source is used, the current source feeds the resonant circuit (807) with a suitable level of energy and compensates for the loss of the resonant circuit (807). In addition, the current source is adjusted relative to the load (819). The node (814) is connected to the node (809) when a semiconductor switch (813) is closed. The node (814) is also connected to the positive supply voltage and the negative supply voltage, respectively, via the winding (823) and the winding (824), respectively, when the semiconductor switch (815) and the semiconductor switch (816), respectively, are closed. The node (814) is connected to the load (819) via an LC filter consisting of a coil (817) and a capacitor (818). The LC filter ensures that high frequency is not transferred.

FIG. 9 shows curves of voltage courses for FIG. 3 at the nodes (352, 353, 354, 355) for a double resonant converter (300).

At the node (352), the voltage oscillates between plus the double voltage across the DC supply circuit (301) and 0V. At the same time the voltage at the node (354) oscillates between 0V and minus the double voltage across the DC supply circuit (301). The voltage at the node (353) is in anti-phase to the voltage at the node (352). Correspondingly, the voltage at the node (355) is in anti-phase to the voltage at the node (354). At the node (353), the voltage oscillates between plus the double voltage across the DC supply circuit (301) and 0V. At the same time the voltage at the node (355) oscillates between 0V and minus the double voltage across the DC supply circuit (301).

FIG. 10 shows curves of voltage courses for FIG. 3 at the nodes (314, 327) and at the load (319) as well as the switching pattern for the switches (313, 315, 316, 326, 328, 329) of a double resonant converter.

When the switch (315) is turned on and the switches (313, 316) are turned off, the voltage at the node (314) will oscillate between plus the double voltage across the DC supply circuit (301) and 0V. When the switch (316) is turned on and the switches (313, 315) are turned off, the voltage at the node (314) will oscillate between minus the double voltage across the DC supply circuit (301) and 0V. During periods of time where the switch (313) is turned on, the voltage at the node (314) will be 0V since the node (314) is connected to earth. The switches (315, 316) may not be turned on simultaneously at any time. The voltage at the node (314) is freed of the high-frequency resonance frequency by filtering, and the voltage therefore assumes the appearance at the load (319) as shown. The frequency and appearance of the voltage at the load (319) are determined by variations of the frequency of pulses at resonant frequency at the node (314). The filter also shifts the phase of the voltage at the load (319) as shown. The resulting voltage at the load (319) is lower than the voltage at the node (314) and can never assume a value higher than the plus/minus voltage across the DC supply circuit (301). When the switch (328) is turned on, and the switches (326, 329) are turned off, the voltage at the node (327) will oscillate between plus the double voltage across the DC supply circuit (301) and 0V. When the switch (329) is turned on, and the switches (326, 328) are turned off, the voltage at the node (327) will oscillate between minus the double voltage across the DC supply circuit (301) and 0V. During periods of time where the switch (326) is turned on, the voltage at the node (327) will be 0V since the node (327) is connected to earth. The switches (328, 329) may not be turned on simultaneously at any time. The voltage at the node (327) is freed of the high-frequency resonant frequency by filtering, and the voltage therefore assumes the appearance at the load (319) as shown. The frequency and appearance of the voltage at the load (319) are determined by variations in the frequency of pulses at resonance frequency at the node (327). The filter also shifts the phase of the voltage at the load (319) as shown. The resulting voltage at the load (319) is lower than the voltage at the node (327) and can never assume a value higher than the plus/minus voltage across the DC supply circuit (301).

What is claimed is:

1. A resonant converter for coupling between a DC circuit and an AC circuit comprising: a resonant circuit having an input to couple to the DC circuit and being coupled to a switch/filter circuit, having an output to couple to the AC circuit, wherein the resonant converter contains a direct connection between a first voltage center in the DC circuit and a second voltage center in the resonant circuit, and wherein the resonant circuit comprises at least one transformer having at least two windings, wherein there is a connection from the at least two windings of the transformer to at least first and second switches, wherein activation of the first and second switches respectively couples the at least two windings to at least a first node, and wherein the first voltage center in the DC circuit is also coupled to the first node by activation of at least a third switch.

2. A resonant converter according to claim 1, wherein the transformer has additional windings which operate in antiphase to the at least two windings.

3. A resonant converter according to claim 1, wherein the resonant converter is used as a DC to AC converter.

4. A resonant converter according to claim 1, wherein the resonant converter is used as an AC to DC converter, wherein the first node of the resonant converter is coupled to the output of the switch/filter circuit, wherein the first node is coupled by activation of the switches to the at least two windings on the transformer, and wherein the at least two windings are coupled to the DC circuit.

5. A resonant converter according to claim 1, wherein the resonant converter is incorporated in an N-phase system having at least one resonant converter per phase, the number of phases N being at least 1.

6. A resonant converter according to claim 5, wherein the resonant circuit and the DC circuit are commonly coupled to several switch/filter circuits in the N-phase system, wherein each phase is formed by activation of independent sets of switches.

7. A resonant converter according to claim 1, wherein the resonant converter is used as an AC to AC converter.

8. A resonant converter according to claim 7, wherein the resonant converter is adapted to convert at least one of a group of parameters including frequency, voltage and current.

9. A resonant converter according to claim 1, wherein the first, second and third switches are semiconductor devices selected from a group consisting of field effect transistors, bipolar transistors, Insulated Gate Bipolar Transistors (IGBT), Gate Turn-Off thyristors (GTO) and Injection Enhanced Gate Transistors (IEGT).

10. A resonant converter according to claim 1, wherein the resonant converter uses three point frequency modulation.

11. A resonant converter according to claim 1, wherein a resonance of the resonant circuit is controlled by at least one of the first, second and third switches in the switch/filter circuit.

12. A resonant converter according to claim 1, wherein a resonance of the resonant circuit is controlled by a current source which is coupled magnetically to the resonant circuit via a core of the transformer.

13. An N-phase resonant converter comprising:
 a first input, a second input and a third input to couple to a DC circuit;
 a resonant circuit including a transformer having a first winding and a second winding, a first capacitor electrically coupled between the first winding and a first node and a second capacitor that is coupled between the second winding and the first node;
 a second node to couple to an AC circuit; and
 a first switch circuit including a first switch coupled in series between the first node and the second node; a second switch coupled between the first winding and the second node; and a third switch coupled between the second winding and the second node;
 wherein N is at least one;
 wherein activation of the second switch creates an electrical coupling between the first winding and the second node and activation of the third switch creates an electrical coupling between the second winding and the second node; and
 wherein activation of the first switch creates an electrical coupling between the first node and the third input.

14. The N-phase resonant converter according to claim 13, wherein the first and second windings are magnetically coupled via a core.

15. The N-phase resonant converter according to claim 13, further comprising a first filter circuit electrically coupled between the second node and the AC circuit.

16. The N-phase resonant converter according to claim 15, wherein N is at least 3, and further comprising:
 a second switch circuit comprising a fourth switch coupled between the first winding and a third node; and a fifth switch coupled between the second winding and the third node;
 a fourth input to couple to a second AC circuit, the fourth input being coupled to the third node;
 a third switch circuit comprising a sixth switch coupled between the first winding and a fourth node; and a seventh switch coupled between the second winding and the fourth node; and
 a fifth input to couple to a third AC circuit, the fifth input being coupled to the fourth node;
 wherein activation of the fourth switch creates an electrical coupling between the first winding and the third node, and wherein activation of the fifth switch creates an electrical coupling between the second winding and the third node; and
 wherein activation of the sixth switch creates an electrical coupling between the first winding and the fourth node, and wherein activation of the seventh switch creates an electrical coupling between the second winding and the fourth node.

17. The N-phase resonant converter according to claim 16, further comprising:
 a second filter circuit electrically coupled between the third node and the fourth input; and
 a third filter circuit electrically coupled between the fourth node and the fifth input.

18. The N-phase resonant converter according to claim 16, wherein the second switch circuit further comprises an eighth switch coupled between ground and the third node; and wherein the third switch circuit further comprises a ninth switch coupled between ground and the fourth node.

19. A double resonant converter to couple between a DC circuit and an AC circuit, comprising:

a transformer having first, second, third and fourth windings, a first terminal of the DC circuit being coupled at a centerpoint between the first and second windings and a second terminal of the DC circuit being coupled to a centerpoint between the third and fourth windings;

a first switch circuit that couples the first and third windings to a first node; and a second switch circuit that couples the second and fourth windings to the first node;

wherein the AC circuit is coupled to the first node;

wherein activation of the first switch circuit forms an electrical coupling between the first and third windings and the first node and activation of the second switch circuit forms an electrical coupling between the second and fourth windings and the first node; and wherein the first and second windings of the transformer are adapted to operate in antiphase with the third and fourth windings.

20. A method of coupling an AC circuit to a DC circuit using a resonant converter, the resonant converter having a DC input to couple to the DC circuit, an AC output to couple to the AC circuit, a transformer having a first winding coupled between the DC input and a first node of the resonant converter and a second winding coupled between the DC input and a second node of the resonant converter, the method comprising:

applying a DC voltage to the DC input; and selectively coupling the first node to the AC output, the second node to the AC output and selectively coupling the AC output to a third node to generate an AC voltage at the AC output.

* * * * *